United States Patent [19]
Goldenberg

[11] Patent Number: 5,661,876
[45] Date of Patent: Sep. 2, 1997

[54] HOSE CLAMP

[76] Inventor: Michael Goldenberg, 12791 Oak Knoll Dr., Palm Beach Gardens, Fla. 33418

[21] Appl. No.: 684,296

[22] Filed: Jul. 18, 1996

[51] Int. Cl.$^6$ ................................................. F16L 33/02
[52] U.S. Cl. .................................... 24/19; 24/269
[58] Field of Search ................... 24/19, 269, 481, 24/482, 274 R

[56] References Cited

U.S. PATENT DOCUMENTS

| | | |
|---|---|---|
| 2,283,179 | 5/1942 | Buckingham . |
| 2,750,645 | 6/1956 | Seltzer . |
| 2,944,314 | 7/1960 | Black . |
| 4,083,588 | 4/1978 | Berger . |
| 4,286,361 | 9/1981 | Mackenzie . |
| 4,480,359 | 11/1984 | Koster . |
| 4,513,801 | 4/1985 | Pedrick et al. . |
| 4,546,524 | 10/1985 | Kreft ........................ 24/19 X |
| 4,638,531 | 1/1987 | Ribrant . |
| 4,667,375 | 5/1987 | Enlund . |
| 4,686,747 | 8/1987 | Bakdahl . |
| 5,257,439 | 11/1993 | LeBlanc ....................... 24/269 |
| 5,323,515 | 6/1994 | Baekdahl . |
| 5,327,618 | 7/1994 | Chene et al. . |

FOREIGN PATENT DOCUMENTS

| 599438 | 1/1926 | France ........................... 24/269 |
|---|---|---|
| 516032 | 12/1939 | United Kingdom ................ 24/19 |

*Primary Examiner*—James R. Brittain
*Attorney, Agent, or Firm*—McHale & Slavin, P.A.

[57] ABSTRACT

An improved hose clamping device which uses a housing with a flexible band extending therefrom, and a cylindrical roller with outwardly protruding spiked elements, the roller rotatably mounted within the housing. A turning mechanism turns the roller and the flexible band engages the spikes on the roller to be drawn forward into and through the housing. The band is ideally constructed in whole or in part of a strong fibrous mesh, such as Kevlar, which facilitates ready engagement with the spiked roller. The embodied turning mechanisms are constructed to allow retraction of the band and counter-rotation of the spiked roller without interference of the turning mechanism handle with surround objects.

19 Claims, 5 Drawing Sheets

HOSE CLAMP

FIELD OF INVENTION

This invention relates to hose clamps and in particular to an improved hose clamp with a constricting band having a pivoting wrench for purposes of tightening the band.

BACKGROUND OF THE INVENTION

Hose clamps are well known coupling devices that can be found on most machinery where a flexible hose is secured to a fixture. Such hoses may convey materials such as air, water, or oil from one part of the machine to another, often under high pressure. As a result, a clamp is usually required over this interface in order to constrict the hose around the fixture and prevent it from slipping off.

A variety of prior art hose clamps exist, typically utilizing a threaded bolt or screw for use in constricting a band placed around the hose. The constricting band encompasses a portion of the hose and the bolt or screw is used to engage the corresponding threads of a worm drive on the encircled band strap, an attached nut, or a gearing system. As the threaded bolt or screw is turned, the strap is pulled forward to constrict the band. Examples of such clamping devices are disclosed in U.S. Pat. Nos. 2,750,645; 2,944,314; 4,286,361; 4,513,801; 4,638,531; 4,667,375; 4,686,747; 5,323,515; and 5,327,618. In each case, an external tool is required to turn the bolt or screw.

U.S. Pat. No. 4,480,359 discloses a circular clamp with a spring loaded lever for causing constriction of the clamp, with adjustment notches for positioning of the lever.

U.S. Pat. No. 4,083,588 discloses a cylindrical clamp with two threaded bolts extending through yokes mounted on one side of the clamp. The T-handled bolts interface with nuts positioned below the yokes on the opposite side of the clamp.

U.S. Pat. No. 2,283,179 discloses a circular clamping device with a threaded bolt attached to one side of the clamp and corresponding threaded wrench on the other side. A bar slidably fits inside an opening in the threaded wrench to allow it to be turned and tightened.

The majority of these devices tighten the clamp by employing the threads of a bolt or screw to advance a free moving opposite end of the clamp. Even with a built-in handle for turning the threaded bolt, this configuration is subject to failure of the threads when placed under high stress loading which is often required of such clamps. As such, the threads on the bolt might become stripped as well as the threads on the receiving nut.

Additionally, on a worm drive where indentations in the band engage the threaded bolt, the bolt tends to lift upwards and away from the engaged band as the tension and curvature of the constricting band increases. This can lead to slippage of the tightening mechanism whereby the band may not be constricted sufficiently to guarantee a seal around the hose. Yet another problem includes localized crimping of the clamp around the screw mechanism. As a result, an even constriction will not be applied around the circumference of the band. This may lead to damage or ineffective sealing of the clamped fixture.

Hence, what is needed in the field is a circular clamping device which eliminates the threaded engagement of a bolt with a receiving nut or worm drive on the band. Instead the clamping device should use a relatively flexible band which is advanced forward via a spiked roller which pinches down upon the band. To engage the spikes on the roller, the band should be constructed of a durable fiber woven into a fabric-like material. Such material might include woven KEVLAR, with the body of the mechanism correspondingly constructed of molded KEVLAR. Such non-metal construction will make the device impervious to corrosion. The roller would be turned via a mechanism which would eliminate the need for external tools in order to operate the clamp. This turning mechanism could come in many forms including a ratcheted or geared system for advancing the roller via a pivoting wrench, lever, or key.

SUMMARY OF THE INVENTION

The present invention is a self-contained circular clamp which is typically used to secure a hose to a related hose outlet fixture. The clamp has a band which encircles the hose and is used to constrict the hose material, typically made from rubber or similar flexible material. The hose is constricted around the fixture to prevent slippage of the hose and leakage of the transported liquid or gas.

The present invention employs a unique construction and method for advancing the band material which includes a spiked roller and a turning mechanism contained in a housing. The band of the clamp is constructed of a woven fibrous material which can flexibly wrap around the hose or other object to be clamped. Preferably, this material will be made from an extremely durable fiber such as KEVLAR so that no slippage or breakage of the fibers will occur. The fibrous band is fed into a receiving slot in the housing and is pinched underneath the spiked roller. The spikes engage the fibers of the material and pull the band forward as the roller is turned in an appropriate direction.

The roller can be turned through a variety of mechanisms, but the preferred embodiment utilizes a pivoting wrench as attached to a ratcheting means. With this configuration, the roller can be advanced forward one ratchet stop at a time until the desired constriction on the band is achieved. The band is secured via a ratchet stop, or pawl, or an auxiliary stop which can be conveniently released. Upon release of the stop, the roller will be free to rotate in the opposite direction, thereby loosening and freeing the band. The clamp can then be retightened or reapplied as needed. Other turning mechanisms include a beveled gearing system.

As the band is retracted from underneath the roller, the counter-rotation would cause a fixedly attached turning mechanism to spin in possible interference with the clamped object. Accordingly, the turning mechanism of the present invention can hingably pivot to prevent such interference. Alternatively, the exposed turning mechanism could be mounted in a non-interfering manner and location, for example a key mounted on top of the housing. Alternatively still, a lever arm might be beneficially used because of its greater torqueability, with a double ratcheted mechanism utilized to prevent interference of the lever arm with the clamped object upon counter-rotation of the roller.

Thus, an objective of the present invention is to provide a constricting clamp with a strap which is advanced through a housing by contact with a rotatable spiked roller.

Yet another objective of the present invention is to provide a constricting clamp with a strap woven from a durable fibrous material.

Still another objective of the present invention is to provide a constricting clamp with a strap and housing constructed from a material such as fibrous and molded KEVLAR.

A further objective of the present invention is to provide a constricting clamp with a self-contained mechanism for advancing the spiked roller and hence constricting band.

Another related objective of the present invention is to provide a constricting clamp with a pivotable handle attached to the ratcheting mechanism to allow non-interfering advancement and retraction of the band.

Still another objective of the present invention is to provide a constricting clamp with a lever arm and a double ratcheting mechanism to allow non-interfering advancement and retraction of the band.

Yet another objective of the present invention is to provide a constricting clamp with a geared winding mechanism to allow non-interfering advancement and retraction of the band.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms of specific embodiments, it will be readily apparent to those skilled in this art that various modifications, rearrangements and substitutions can be made without departing from the spirit of the invention. The scope of the invention is defined by the claims appended hereto.

Figure 1:
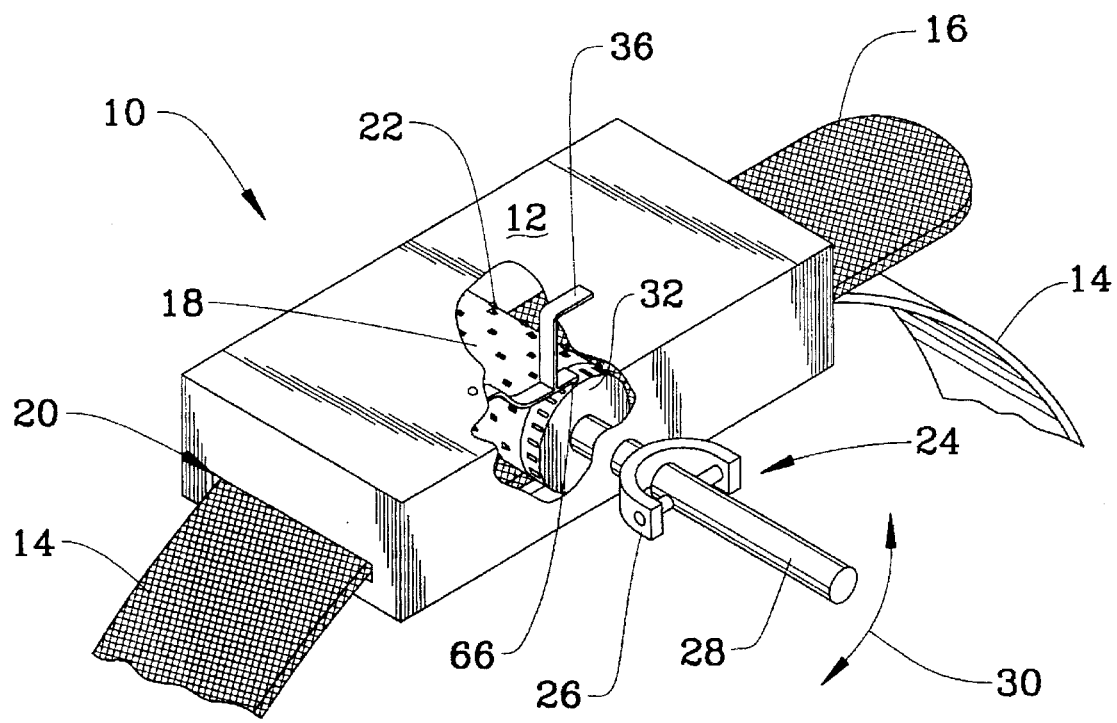
FIG. 1 shows a pictorial view of the constricting clamp with a cutaway to the interior of the housing mechanism for a device with a pivoting handle for advancing the roller and thereby constricting the strap.

Referring now to FIG. 1, a constricting clamp device 10 is shown with a cutaway to the interior section of the housing. The housing 12 is generally rectangular in shape and has a band 14 which extends out from one side of the housing and is wrapped around to encircle the object to be clamped. The band is preferably constructed from a weave of fibrous material with a flexible, fabric-like texture. The fibers used are preferably made from KEVLAR which is durable and strong enough to be used in constructing bullet-proof vests. Hence a weave of such fibers would resisting all stretching, shearing, and/or tearing applied by the spiked roller 18.

The band end 16 is fed into a receiving slot 20 which guides the band under the roller 18. As shown, the roller 18 has a plurality of spiked elements 22 which bite into the fabric-like mesh of the band 14. The roller 18 is oriented to provide sufficient downward pinching of the band 14 in order to insure non-slip advancement of the band when the roller 18 is turned. In this embodiment, the spiked roller 18 is connected to a turning handle mechanism 24. This particular mechanism 24 includes a stirrup-shaped fixture 26 which has a handle 28 hingably attached so that it swings back and forth inside the stirrup 26 as shown by the arrows 30.

On one end of the spiked roller 18, in this example the end nearest the handle 28, a circumferential ring of ratchet stops 32 is oriented to interface with a springing ratchet lever 36. The ratchet lever 36 has a protrusion, or pawl 66, for penetrating and interfacing with the ratchet stops which allows counter-clockwise movement of the spiked roller 18 to advance the band 14. By swinging the handle 28 upwards or downwards in the stirrup 26, a lever arm is provided whereby significant torquing action can be applied to advance the roller 18. This might become necessary as the band 14 constricts around the object to be clamped, e.g. a rubber hose under high pressure.

At the same time, the rachet lever 36 prevents clockwise movement of the band 14 which would occur as the band slips backwards in the housing 12 and counter-rotates the roller 18. Supplementary stops on the band 14 can also be provided as shown below. Such stops might be necessary where the back pressure working against constriction of the band 14 is great enough to challenge the holding power of the ratchet alone.

A ratchet release handle as part of the ratchet lever 36 is also made to protrude outside the housing 12 for ready access by the user. When it is desired to release the band 14 to re-adjust the clamping device 10, or to remove it entirely, the release 36 is lifted and the ratchet pawl 66 no longer engages the ring of rachet stops 32. Any other stops, while not shown here, would also need to be released in order to allow the spiked roller 18 to spin freely. The band 14 can then be retracted from the housing 12. The handle 28, as connected to the stirrup 26, will correspondingly rotate with the clockwise-spinning roller 18. In order to facilitate free spinning of the handle mechanism 24, the pivoting handle 28 is swung to a central position as shown in FIG. 1. This allows the mechanism to spin without interference from the clamped object which would be in the path of the counter-rotating handle 28 if the handle did not pivot to a neutral position.

Figure 1A:
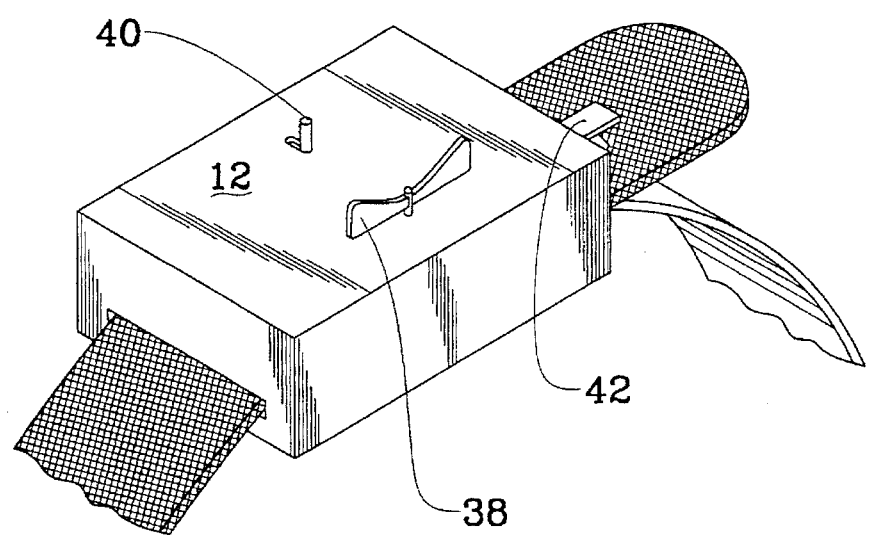
FIG. 1A shows a pictorial view of the constricting clamp housing mechanism with a geared key-type handle for advancing the roller and thereby constricting the strap.
Figure 6:
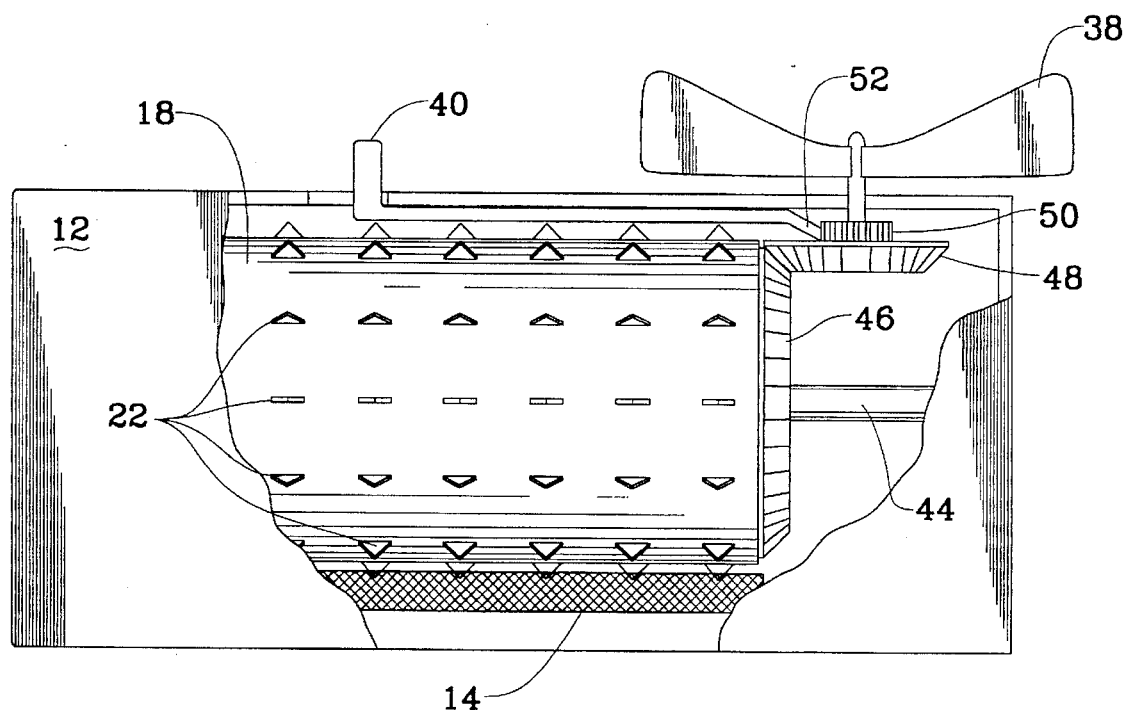
FIG. 6 shows a cutaway view of the interior of the housing for an alternative clamp embodiment whereby the spiked roller is advanced via a key connected to beveled gearing.
Figure 7:
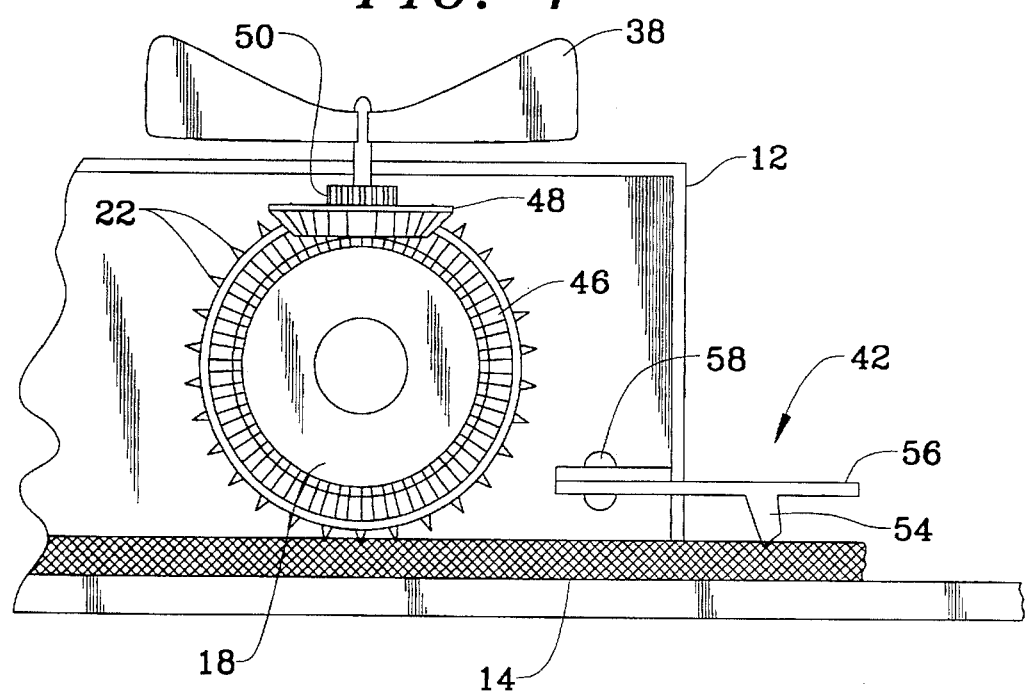
FIG. 7 shows a side view of the beveled gearing embodiment of FIG. 6.

Referring now to FIG. 1A, an alternative embodiment is shown which includes a winding key 38 extending outside of the housing 12, along with a release lever 40 for releasing a ratcheting mechanism. An additional band stop 42 is shown for further arresting backward movement of the band inside the housing as discussed above. Referring also to FIGS. 6 and 7, more detailed cutaway views are shown of the roller turning mechanism. In FIG. 6, a cutaway of the housing 12 exposes a front view of the roller 18 with the spiked elements 22. The spikes 22 penetrate the mesh and the band 14 to advance the band forward when the roller turns. The roller 18 is mounted on an axle 44, and the end of the roller has a circular beveled gear 46. The key 38 has a corresponding beveled gear 48 which interfaces with gear 46. A toothed gear 50 is mounted to interface with a ratcheting end 52 on the release lever 40. FIG. 7 shows a side view of the beveled gear mechanism 46, 48 as the spiked elements 22 on roller 18 interact with the fabric of the band 14.

Referring now to FIGS. 1A, 6, and 7 in combination, an additional band stop 42 is provided which consists of a downward facing, spring loaded protrusion 54 for penetrating the mesh of the band end fabric. To release the stop, a lifting tab 56 is provided for the user's finger. The stop 42, or pawl, is attached with, for example, a screw, weld, or rivet means 58. The stop 42 flexes downward due to springing of the material. Hence, in operation, the beveled gear 48 on the key 38 drives the roller gear 46. When turned counter-clockwise, the roller 18 advances the band 14 through the housing 12. The key ratchets forward via 50, 52 and the band is further secured by stop 42. Upon release of the lever 40 and tab 56, the band can be retracted and the roller and key can counter-spin without interference with the clamped object.

Figure 2:
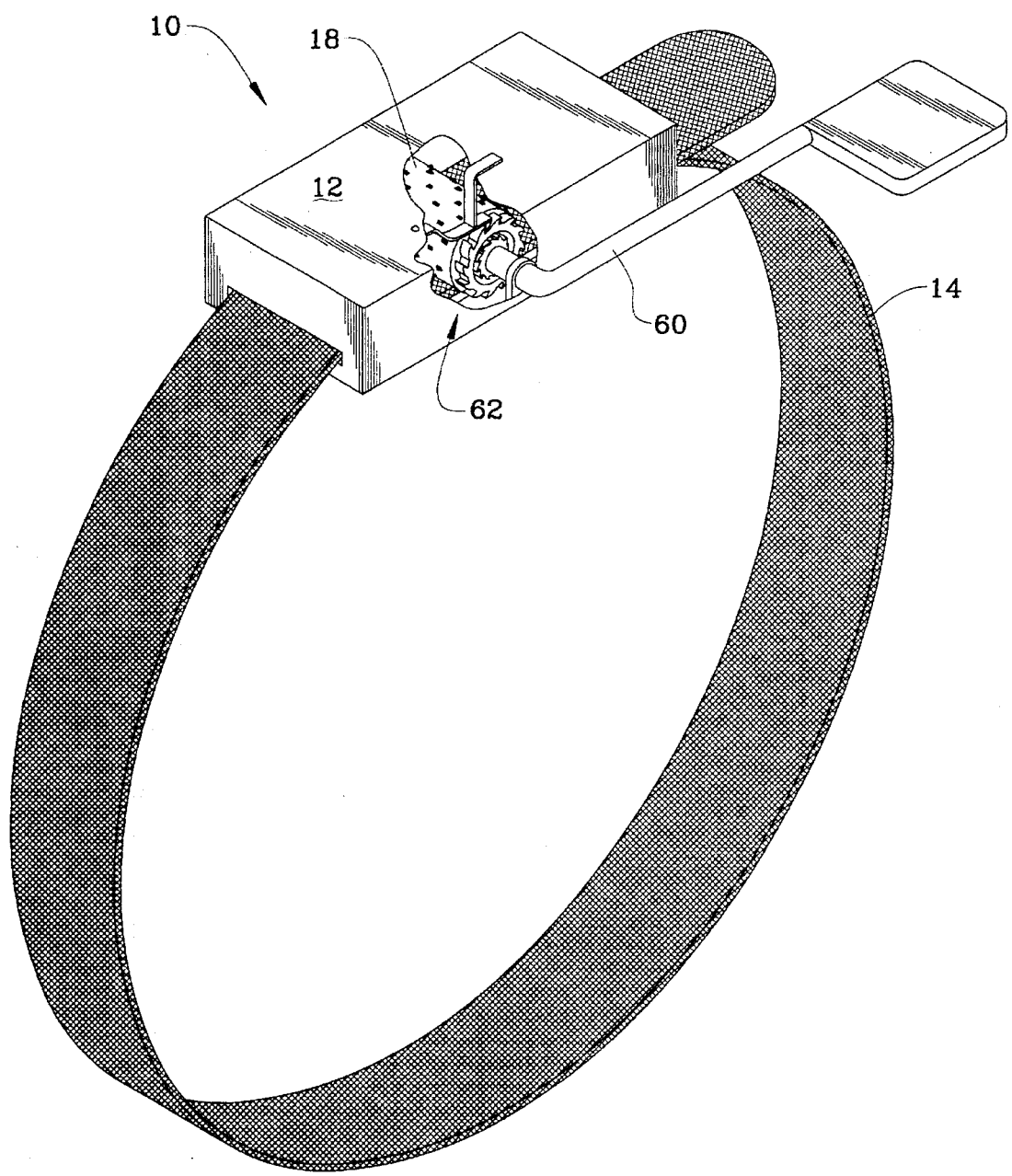
FIG. 2 shows a pictorial view, of the constricting clamp with a cutaway to the interior of the housing mechanism for a device with a lever arm and double ratchet for advancing the roller and thereby constricting the strap.

Referring now to FIG. 2, a full pictorial view of a clamping device embodiment 10 is shown. As before, the band 14 is comprised of a fiber mesh. The band 14 should be entirely composed of such a fibrous mesh across its entire length so as to provide a continuous gripping surface. In this embodiment, the figure shows a cutaway of the housing 12, thereby revealing a double ratcheting mechanism 62 with a levered handle 60 for turning the roller 18. In this configuration, the levered handle 60 has a longer moment arm and can therefore be used to more easily apply greater torque to the roller 18.

Figure 3:
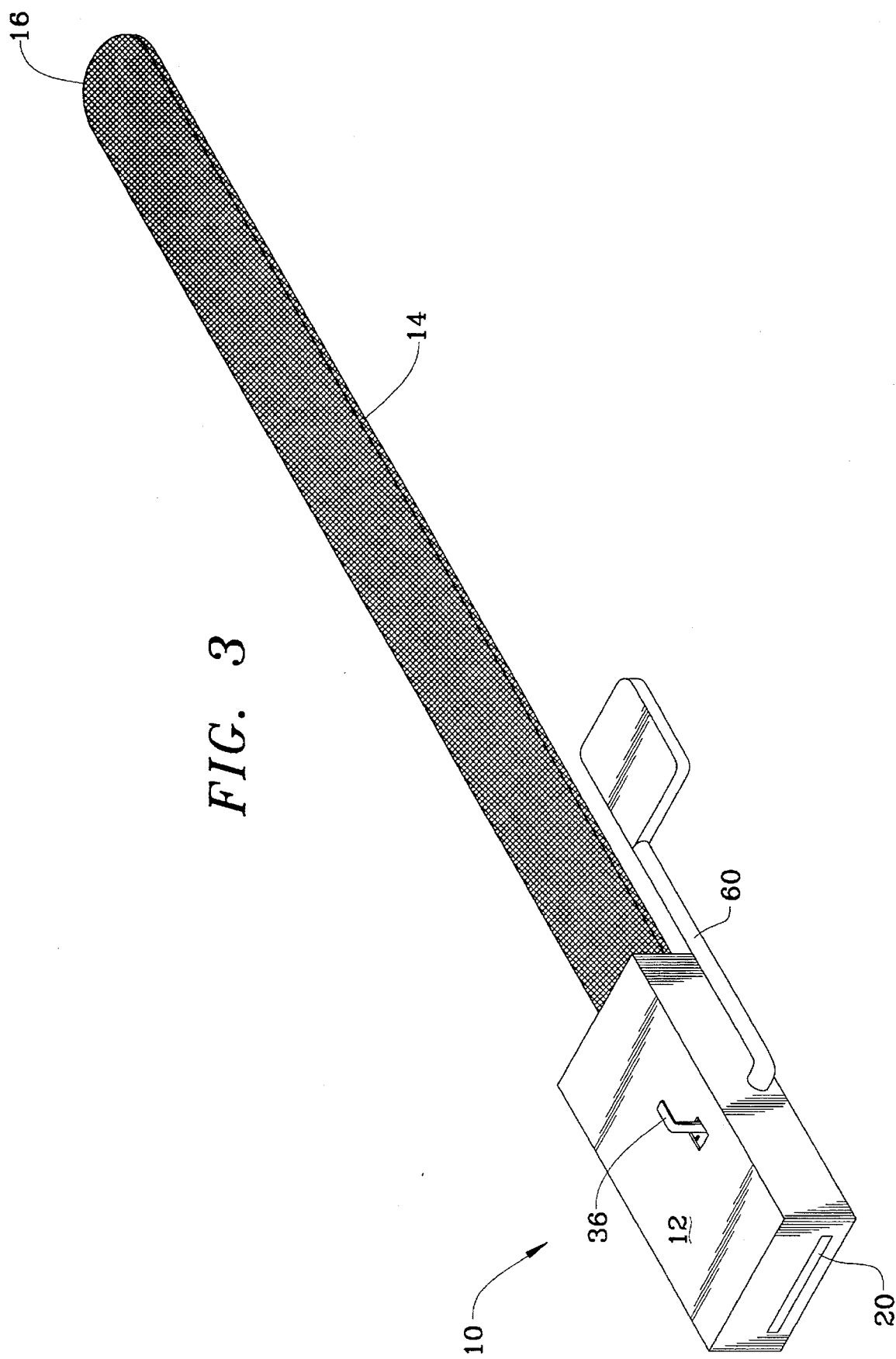
FIG. 3 shows a pictorial view of an embodiment of the constricting clamp mechanism with the fibrous strap outside of the housing.

FIG. 3 additionally shows this embodiment of the clamping device 10 with the band 14 extended out before it is wrapped around an object to be clamped. This view more clearly shows the receiving slot 20 in the housing for inserting the end of the band 16.

Figure 4:
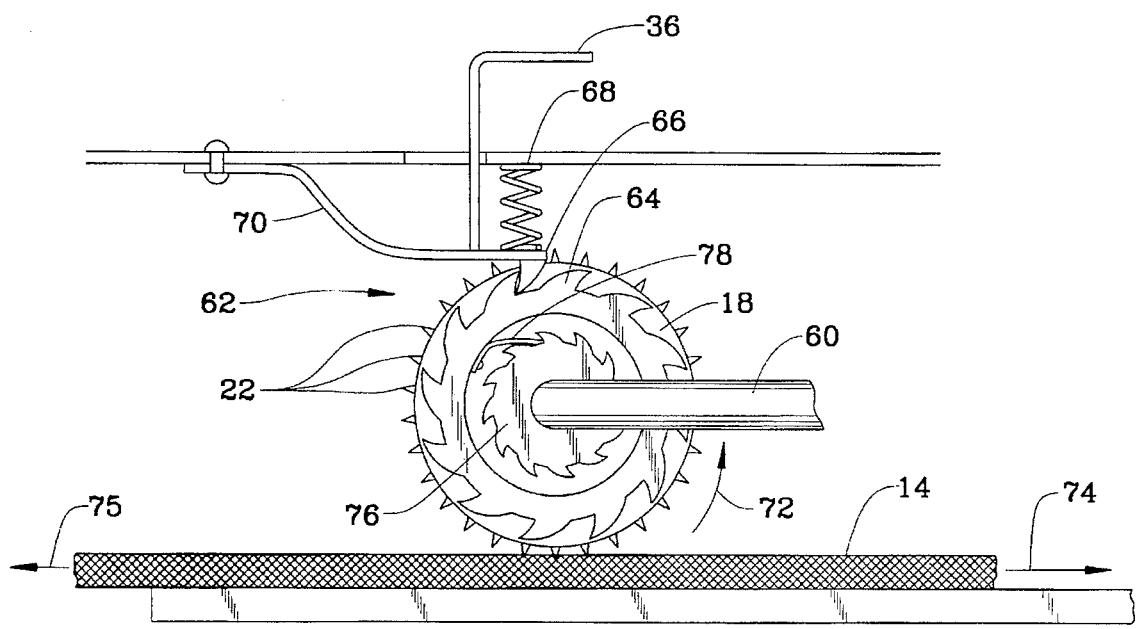
FIG. 4 shows an side view of the interior of the double ratcheting mechanism as typically found on FIGS. 2 and 3.

Referring also to FIG. 4, a more detailed side view of the double ratcheting mechanism 62 is shown. As before, the roller 18 has spiked elements 22 which penetrate the fibrous mesh of the band end 16. On the end of the roller 18, a first ratcheting gear 64 interfaces with the ratchet stop or pawl 66 which is attached to the release lever 36. The release lever 36 and stop 66 are spring loaded into contact with the ratcheting gear 64 through use of the spring 68 and the flex of the lever material 70. A second ratcheting gear 76, and corresponding stop or pawl 78 are oriented in the opposite direction and allow the handle to turn clockwise inside the roller drum 18.

Accordingly, the double ratcheting configuration is used to allow the band 14 to be advanced and retracted without the handle 60 become an interference. The roller 18 ratchets to move counter-clockwise 72, while the stop 78 allows the handle 60 to positively advance the roller. This allows the mechanism to advance the band 14 forward in direction 74 due to the spikes 22. Once the lever arm 60 travels through a free swinging arc, it is then ratcheted clockwise via the orientation of the ratchet teeth on second gear 76, with roller remaining stationary. Additionally, when the lever 36 is lifted, the band can be retracted in direction 75. This will cause the roller to spin clockwise, but the handle 60 will remain stationary due to the orientation of gear 76. As a result, the handle will not interfere with the clamped object when removing the clamp.

Figure 5:
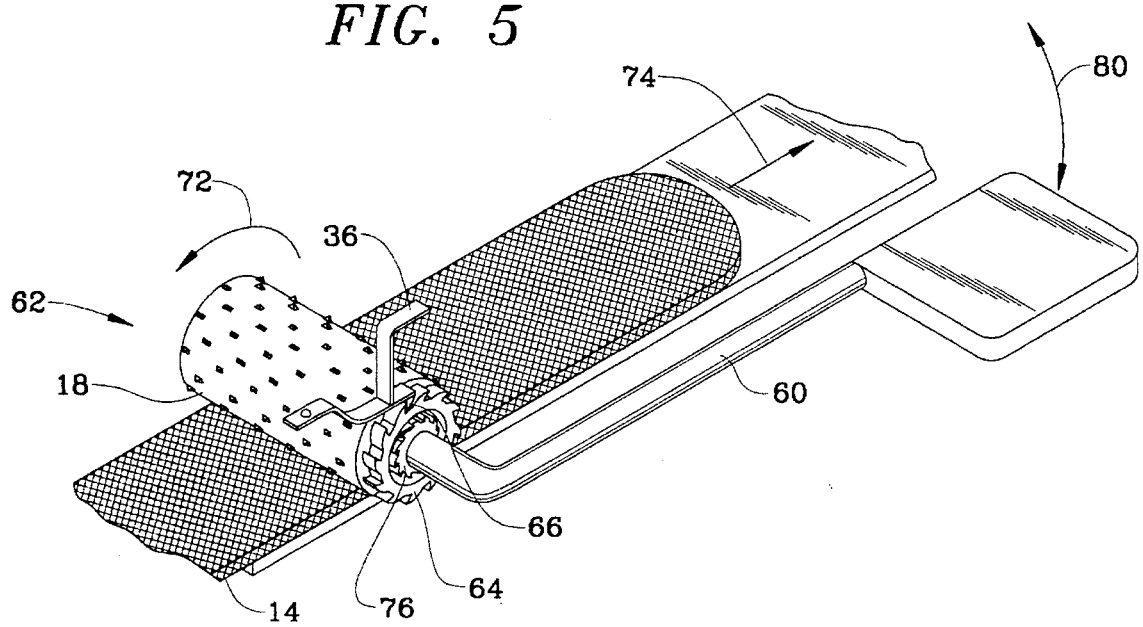
FIG. 5 shows a pictorial view demonstrating the advancement of the fibrous band forward as the spiked roller is turned counter-clockwise.

FIG. 5 additionally shows a pictorial view of part of the mechanism 62 of FIG. 4. As further illustrated, the handle 60 swings forward and back in the direction 80. Upon counter-clockwise motion 72 of the roller 18, the fibrous mesh of the band end 16 is advanced forward via the double rachet gears 64, 76. The lever 36 and stop 66 prevent retraction of the band 14 until desired. As described above, other band stops can be added to the device as needed.

Note that the turning mechanism handles 24, 38, and 60 as shown in FIGS. 1–7 might be interchangably used to provide more versatility and/or leverage on the roller 18. For instance, a lever 60 might be used in place of the key 38 to provide a longer lever arm for application of more torque. Additionally, the pivoting handle 24 might be used to avoid possible interference with surrounding objects when turning the handle.

Because this device may be used in a variety of harsh environments, a non-metal construction is preferred to prevent corrosion and rust. One material, as mentioned above, which might lend itself ideally to this task is Kevlar. Kevlar fibers are generally known to be stronger than steel. Hence, the fibers of the band end 16 could be constructed of this extremely durable material without fear of breakage or stretching. The associated parts could also be constructed of molded KEVLAR in order to be compatible in strength. Molding of the parts would allow for easier control over the necessary precision versus machining of metal parts. Of course, other materials might also be used including metals or durable plastics. Such materials could be used alone, or in combination with each other as needed to meet the strength requirements of various clamping needs.

Moreover, while self-contained devices are shown which do not require an external tool to turn the spiked roller, any of the shown embodiments could easily be modified to include a tool receiving head or aperture for turning the roller. This might include a screwdriver slot, hex-wrench aperture, or some other specialized interface.

It is to be understood that while certain forms of the invention are illustrated, they are not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. A clamping apparatus for constrictably clamping an object by using a variable length band, said apparatus comprising: a housing means; a flexible band means constructed of a fibrous mesh material for encircling an object to be clamped; a cylindrical roller having an inner surface spinably mounted in said housing means, an outer surface having a plurality of spiked elements for engaging said band; and a turning mechanism for rotation of said spinably mounted roller; wherein said band means facilitates non-slip engagement with said roller spikes when said band is advanced through said housing means allowing engagement of said spikes on said roller, with forcible constriction of a clamped object thereby occurring.

2. The clamping apparatus of claim 1, wherein said turning mechanism includes a ratcheted wheel on one end of said cylindrical roller and a levered pawl flexibly mounted to said housing means, with a handle pivotally connected to a stirrup mount extending axially from said roller, whereby said handle is used to torqueably rotate said roller.

3. The clamping apparatus of claim 2, wherein said band can be retracted by lifting said levered pawl, said roller thereby counter-rotating, and said handle being pivoted to a non-interfering position as said roller counter-rotates.

4. The clamping apparatus of claim 3, wherein said housing means includes a releasable band arresting means for further preventing movement of said band.

5. The clamping apparatus of claim 1, wherein said turning mechanism includes a turnable handle with an axially mounted ratchet gear and a beveled gear, said cylindrical roller having a corresponding axially mounted beveled gear on one end, said housing means having a releasable ratchet pawl, whereby turning of said handle engages said gears and ratchets said roller forward thereby advancing said band.

6. The clamping apparatus of claim 5, wherein said turnable handle includes a winding key.

7. The clamping apparatus of claim 5, wherein said turnable handle includes a lever arm.

8. The clamping apparatus of claim 5, wherein said turnable handle includes a handle pivotally connected to a stirrup mount extending axially from said roller.

9. The clamping apparatus of claim 5, wherein said housing means includes a releasable band arresting means for further preventing movement of said band.

10. The clamping apparatus of claim 9, wherein said band can be retracted by releasing said ratchet pawl and said arresting means, said roller and handle thereby counter-rotating, said handle being mounted in a non-interfering position through said housing means.

11. The clamping apparatus of claim 1, wherein said turning mechanism includes a first ratcheted wheel on one end of said cylindrical roller and a first levered pawl flexibly mounted to said housing means, and a second ratcheted wheel and a second pawl rotatably mounted inside said roller with a turnable handle extending therefrom, whereby said handle positively rotates said roller in one direction and ratchets backward in the other direction.

12. The clamping apparatus of claim 11, wherein said turnable handle includes a lever arm.

13. The clamping apparatus of claim 11, wherein said turnable handle includes a winding key.

14. The clamping apparatus of claim 11, wherein said turnable handle includes a handle pivotally connected to a stirrup mount extending axially from said roller.

15. The clamping apparatus of claim 11, wherein said housing means includes a releasable band arresting means for further preventing movement of said band.

16. The clamping apparatus of claim 11, wherein said band can be retracted by releasing said first levered pawl and said arresting means, said roller thereby counter-rotating, said handle remaining stationary in a non-interfering position via said second ratchet.

17. The clamping apparatus of claim 1, wherein said fibrous material includes a durable, moldable composite.

18. The clamping apparatus of claim 1, wherein said housing, roller, and turning mechanism materials are constructed of a durable, moldable composite.

19. The clamping apparatus of claim 1, wherein said turning mechanism is operated without the use of external tools.

* * * * *